UNITED STATES PATENT OFFICE.

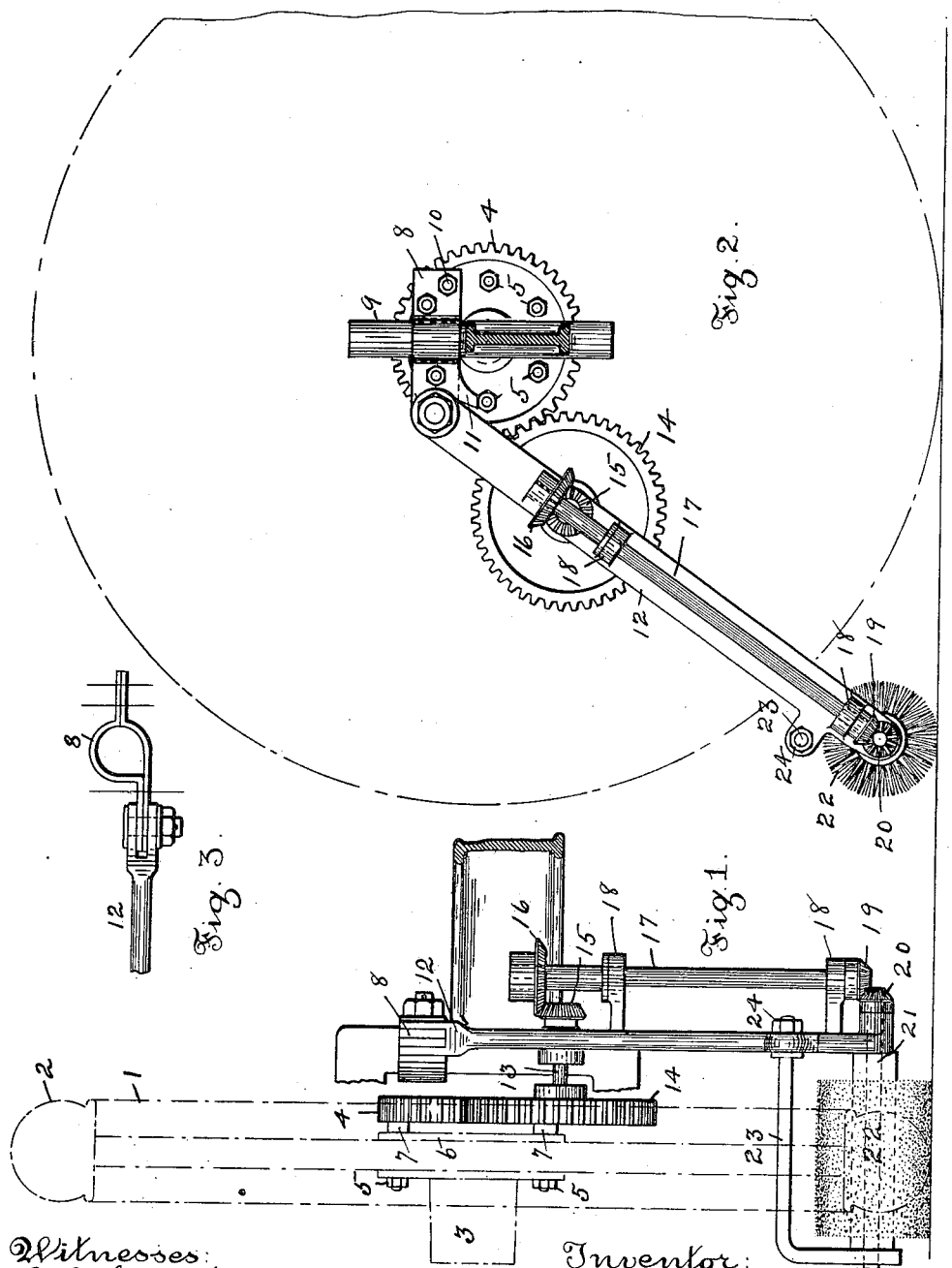

GEORGE A. FABER, OF BALTIMORE, MARYLAND.

TIRE-PROTECTOR FOR MOTOR-VEHICLES.

1,219,447.

Specification of Letters Patent. Patented Mar. 20, 1917.

Application filed March 22, 1916. Serial No. 86,029.

*To all whom it may concern:*

Be it known that I, GEORGE A. FABER, a citizen of the United States, residing at Baltimore, in the State of Maryland, have invented certain new and useful Improvements in Tire-Protectors for Motor-Vehicles, of which the following is a specification.

This invention relates to improvements in tire protectors for motor vehicles, and has for its object to provide a cheap, simple and efficient device for removing obstacles from in front of the wheels and thereby preventing the tires from being punctured.

The invention consists of the novel construction and arrangement of the parts and combination of parts hereinafter more fully set forth in the following specification and pointed out in detail in the appended claims.

In the accompanying drawings,—

Figure 1 is a front view of my invention applied to a vehicle wheel, the latter being shown in dotted lines.

Fig. 2 is a side view of Fig. 1.

Fig. 3 is an enlarged detail view of the clamp which holds the frame to the axle.

Referring to the accompanying drawings, forming part of this specification, and in which like reference numerals designate like parts throughout the several views thereof, 1 designates the wheel rim upon which the tire 2 is mounted, and to the hub 3 of which is secured a gear-wheel 4 held thereto by the bolts 5. Surrounding the bolts 5 between the gear-wheel 4 and the plate 6 are collars 7 to hold the said gear-wheel 4 in its proper position. The said gear-wheel 4 being fixed to the vehicle wheel revolves with the latter. The clamp 8 is held to the knuckle 9 by the bolts 10 and is provided with a stop 11 on its lower forward end. The rod 12 has its upper end pivoted to one end of the clamp 8, and carries a shaft 13 which projects through said rod 12 and is provided with a gear-wheel 14 on one end in mesh with the gear-wheel 4, and its opposite end is provided with a beveled gear-wheel 15 in mesh with the beveled gear-wheel 16 on the upper end of the vertical shaft 17, which latter is mounted in the lugs 18 on the rod 12 and is provided with a beveled gear-wheel 19 on its lower end in mesh with the beveled gear-wheel 20 on the brush shaft 21 to which latter is secured the brush 22. The said brush shaft 21 is mounted in the lower end of the rod 12 and the lower end of the bracket 23, which latter is bolted to the rod 12 at 24. When the brush 22 wears away the rod 12 rests against the stop 11 to prevent the lower end of said rod 12 from coming into contact with the ground.

When the vehicle is moving forward the brush 22, through the medium of the mechanism above described, will be revolved in the opposite direction to that of the vehicle wheels, whereby any obstacle in front of the wheels which might cause a puncture of the tires will be brushed aside.

The device may be secured in front of each of the front wheels, or may be secured in front of all the wheels of the vehicle.

Having thus described my invention, what I claim is:

The combination with a vehicle wheel, of a gear-wheel secured to the vehicle wheel, a rod pivotally secured at its upper end, a shaft projecting through said rod at right angles thereto, a gear-wheel on one end of said shaft in mesh with the gear-wheel on the vehicle wheel, a gear-wheel on the opposite end of said shaft, a brush mounted in the lower end of said rod and having a beveled gear-wheel on one end thereof, a shaft mounted on said rod parallel therewith, a beveled gear-wheel on the upper end of said parallel shaft driven from the gear-wheel on the first mentioned shaft, and a beveled gear-wheel on the lower end of said parallel shaft in mesh with the beveled gear-wheel on the brush.

In testimony whereof I affix my signature in the presence of two witnesses.

GEORGE A. FABER.

Witnesses:
CHAPIN A. FERGUSON,
MAUDE M. AMOSS.

Copies of this patent may be obtained for five cents each, by addressing the "Commissioner of Patents, Washington, D. C."